Patented Oct. 3, 1944

2,359,354

UNITED STATES PATENT OFFICE 2,359,354

MILLING RUBBER

Charles H. Campbell, Kent, Ohio

No Drawing. Application September 6, 1940,
Serial No. 355,633

1 Claim. (Cl. 260—766)

This invention relates to the compounding of rubber with a pigment of fine particle size, and particularly to the compounding of rubber with carbon black.

Raw rubber, in the form of smoked sheets, crepe rubber, or other commercial form, is masticated, or milled, by means of a horizontally arranged pair of rolls rotated toward each other at unequal speed. The rubber being placed between the rolls is violently kneaded by them because of the unequal speed at which they travel, the violence of this working being greater with increased "nip" of the rolls. During the milling, the rubber is gradually broken down structurally to give it greater softness and plasticity.

Carbon black, and other pigments, are added during the milling, the pigment being taken into, and distributed in, the batch as the milling proceeds. It is thus a matter of importance that the rubber be not only sufficiently soft to receive the pigment, in order that a maximum quantity be included but sufficiently hard and resistant to disperse the pigment uniformly in the batch. There is in the milling a continuing balance between the softening effect of the milling and the stiffening effect of the pigment.

Carbon black, and particularly carbon black of the channel black type as compared with thermal decomposition blacks, serves as the best reinforcing pigment to date. For rubber of any given initial properties the stiffening is, under the best conditions, roughly proportional to the proportional inclusion of the carbon black. When the carbon black is added during milling, its stiffening effect becomes pronounced after a considerable quantity of the carbon black has been added. Satisfactory addition of carbon black to the rubber is dependent upon uniform distribution of the black in the rubber, and any lack of uniformity in its distribution tends to streak the batch and render it unfit for use.

In theory it is possible by increasing the softening effect on the rubber, more quickly and easily to incorporate the carbon black in the rubber, and to add an increased quantity of carbon black. If, however, the rubber be made too soft preparatory to the addition of the carbon black, it lacks the cohesion necessary properly to disperse the pigment, and the carbon black segregates destroying the usefulness of the batch.

I have discovered a procedure by which I shorten the time spent in milling carbon black (typical of the finely divided rubber-reinforcing pigments) into the rubber, and produce compounded rubber of improved quality. Roughly stated, it consists essentially in adding to the rubber a finely dispersed hydrocarbon oil, or hydrocarbon oil composition, having an effective solvency in, or for, the rubber, and the ability to wet the carbon black.

Addition of the hydrocarbon oil to the rubber swells the rubber. Theoretically this swelling involves an intra-molecular distension, or opening, of the macro-molecules of the rubber to give a screen, or lattice, capable of exerting an increased wetting effect on the carbon black particles. If the hydrocarbon oil be so applied that its swelling effect is uniform throughout the rubber of the batch, and its solvent action on the rubber is not excessive, the results rising from its use are wholly beneficial.

Typically I use a rubber reclaiming oil, capable of forming an oil-in-water emulsion, and consisting essentially of a composition of aromatic and aliphatic hydrocarbon oils, in which the solvency of the aromatic content in or for the rubber is tempered by the less active aliphatic content. Desirably, but not necessarily, that rubber reclaiming composition is one disclosed in my Patent No. 2,145,341, dated January 31, 1939; or the co-pending application of Robert W. Ostermayer and myself, Serial No. 341,140, filed June 18, 1940.

Desirably, I emulsify the hydrocarbon oil, or hydrocarbon oil composition, with water in preparation for use in compounding the rubber. The emulsion may be made in any suitable manner, as by passing the oil and water through a centrifugal high-speed pump, and most desirably by passing the oil through a colloid mill with the water, and with or without a stabilizing agent. As a stabilizing agent I may employ any of the various filter clays, of which bentonite may be taken as typical, or any other of the known emulsifying agents which does not in the small quantity used react chemically with any substantial proportion of the rubber, or other ingredient of the rubber composition. I have found that clay is effective to stabilize the emulsion if included in a quantity as small as 1% the total weight of the emulsion, and other stabilizers alternatively may be used in small quantities proportioned to the individual effectiveness of each. I may vary widely the proportions of oil, water and stabilizer in the emulsion, and prefer an emulsion which varies from about 1 part of oil to 1 part of water to about 1 part of oil to 2 parts of water, with not more than 2% of clay as a stabilizer.

In preparing the rubber for compounding, I add the emulsion to the rubber in the rolls, desirably beginning to add it before the actual addition of pigment is started. The addition is made, desirably in a continuous manner, as by the dripping of small droplets, or in the dispersion of a spray of any specific sort, and the dispersed oil may be added as fast as the rubber can take it up. The total quantity of emulsion added to the batch may vary widely in milling the carbon black into rubber of different grades, and I have found it usually adequate to add to the batch enough total emulsion to apply oil in a quantity equal to about 1% to 3% the weight of the rubber in the batch, assuming that the oil is a composition having the approximate solvent effectiveness of the oils disclosed in the noted patent and application. With a composition of greater effectiveness, it is suitable to use a somewhat lesser percentage for any given grade of rubber and conditions of milling. In using a rubber reclaiming oil having solvent effectiveness in lesser order than the hydrocarbon oil composition of the patent and application above-identified, such for example as dipentene, it is desirable to apply a total quantity of the oil amounting to a higher percentage of the weight of the batch for any given grade of rubber being milled and conditions of milling.

The use of dispersion in applying the solvent oil is of great advantage in adequately swelling the entire body of rubber without adding so much oil as unduly to soften it. In this, emulsification of the oil for application is of particular advantage when using hydrocarbon oils having relatively high solvency for the rubber. By adding the hydrocarbon oil as a dispersed emulsion, it is a simple matter to watch the condition of the batch as it takes up the oil, and to stop the addition when the swelling appears adequate. This is an important feature.

It is to be understood that the mills on which the rubber is milled and compounded are, as above indicated of well-known organization, and that the mills and milling operations primarily follow well known and accepted procedure. After the rubber has been substantially swollen by addition of the hydrocarbon oil, and its distribution in the batch, I begin the addition of the carbon black. This I add as rapidly as it is taken up by and distributed in the rubber, and may begin to add it either during the continued addition of the hydrocarbon oil, or after it has been completely added.

Because the rubber is swollen by addition of the hydrocarbon oil, or oil composition, the carbon black is taken into and distributed in the rubber much more easily and quickly than it would be without the swelling caused by the oil. Even though the milling operation be otherwise in accordance with standard procedure, the swelling of the rubber so speeds the distribution of the carbon black in it, that the desired content of carbon black is incorporated with decreased milling. I do not need structurally to break down the rubber as much as is usual in ordinary procedure, in order to distribute a high content of carbon black in the rubber. I am, therefore, able to include a high content of carbon black, and in this connection I again use carbon black to typify the various analogous reinforcing agents, without overworking the rubber to do so. The compounded rubber is thus of improved quality; and economy is also attained in that a mill is able, because of a shorter milling period, to compound a greater number of batches and weight of rubber in a working day of fixed length.

Returning to the addition of the solvent oil, by adding the oil in dispersion, and particularly by adding it in emulsion, I am able to swell the rubber enough to give the wished for rapidity and ease in milling in the carbon black, without detracting from the desired properties of the rubber. The dispersed condition of the oil as it is added makes the desired swelling of the rubber uniform, and permits swelling in requisite order to be had with a minimized quantity of the oil.

Whatever be the mechanism involved in my method of compounding the rubber with carbon black, I have discovered that by following the above-described procedure, I am also able, within the limits of permissible carbon black inclusion, satisfactorily to increase the inclusion of carbon black in the batch, if an increase in the content of carbon black be desired. As an increase over the carbon black inclusion by prior practice, with or without softeners for the rubber, this percentage may be substantial.

Emulsification of the hydrocarbon oil is of importance as a factor in obtaining the requisite finely dispersed addition of the oil by providing a dispersion within the minute droplets applied to the batch of rubber by the dispersion of the spray. In the milling operation, considering that operation as a whole, it performs also a secondary function of substantial importance. That function is one of temperature regulation. In the milling it is not always easy to maintain the temperature of the batch below a temperature at which the rubber would be scorched. This is for the reason that the heat generated by the working of the rubber, the heat generated by the swelling of the rubber, and the heat generated in the wetting of the carbon black by the rubber contribute to raise the temperature of the batch. When, in accordance with my preferred practice, the hydrocarbon oil or composition is added in water emulsion, the water of the emulsion by its evaporation so abstracts heat from the batch that it acts as a temperature regulator for the batch, carrying off excess heat proportionally as the temperature of the batch tends to rise.

This secondary function, performed by the water of the emulsion, is of particular importance in summer operation In summer, the temperature of the coolant water being relatively high, it is sometimes ineffective adequately to limit rise in the temperature of the batch as milling proceeds. The evaporation of the emulsion water, may thus be used to supplement cooling circulation through the rolls in preventing scorching of the rubber. For this reason I prefer for summer use an emulsion having a higher ratio of water to oil than would be of particular advantage for winter operation; using for example an emulsion in a 1.5:2 ratio of oil to water, or an emulsion in a 1:2 ratio of oil to water rather than the 1:1 oil-water ratio which I prefer for winter use.

It is to be understood that the specific disclosure given above is to be taken as exemplary of rather than as limiting my invention. Many emulsifying agents are known, and any save those which have obvious disadvantages for my purposes may be used to stabilize the emulsion. The emulsion may be made in any suitable known manner, and may be made without the use of a stabilizer if so desired. The hydrocarbon oil of the emulsion may be any oil, or combination of oils, which has solvency in or for the rubber and which has the ability to wet the carbon black. Although carbon black is the most important rubber pigment which it is desirable to incorporate in large quantity in the rubber, my method is useful for including other pigments having reinforcing properties, such as magnesium carbonate, zinc oxide, clay, treated whiting, and special grades of thermal decomposition blacks, all of which pigments the hydrocarbon oils have ability to wet.

I claim as my invention:

In compounding rubber with a finely-divided pigment by milling in the pigment while breaking down a coherent body of the rubber on rolls; the herein-described steps of controllably swelling the coherent mass of the rubber preparatory to adding the pigment by spraying on the rubber on the roll a physically-dispersed water emulsion of hydrocarbon oil having solvency for the rubber and ability to wet the pigment, the said emulsion being composed of about 1 to 2 parts of water to 1 part of the said hydrocarbon oil, and after the rubber has been substantially swollen by addition of the hydrocarbon oil and its distribution in the batch, milling the pigment into the swelled coherent mass, and ending the spraying before sufficient of the hydrocarbon oil has been added substantially to impair cohesion in the mass of rubber being milled.

CHARLES H. CAMPBELL.